(12) United States Patent
Lim et al.

(10) Patent No.: US 8,995,538 B2
(45) Date of Patent: Mar. 31, 2015

(54) POWER DISTRIBUTION METHOD AND APPARATUS FOR OFDM SYSTEM

(75) Inventors: Yeon Ju Lim, Seoul (KR); Jae Yoel Kim, Suwon-si (KR); Sung Ryul Yun, Suwon-si (KR); Hak Ju Lee, Incheon (KR); Se Ho Myung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 771 days.

(21) Appl. No.: 12/658,293

(22) Filed: Feb. 5, 2010

(65) Prior Publication Data

US 2010/0202545 A1 Aug. 12, 2010

(30) Foreign Application Priority Data

Feb. 6, 2009 (KR) ........................ 10-2009-0009666

(51) Int. Cl.
*H04L 27/28* (2006.01)
*H04L 5/00* (2006.01)
*H04L 1/00* (2006.01)

(52) U.S. Cl.
CPC ............ *H04L 5/0044* (2013.01); *H04L 1/0026* (2013.01); *H04L 1/0029* (2013.01); *H04L 5/006* (2013.01)
USPC ............................................ 375/260; 455/69

(58) Field of Classification Search
CPC ... H04L 1/0026; H04L 1/0029; H04L 5/0044; H04L 5/0046; H04L 5/006; H04L 5/0094

USPC ............. 375/260, 267, 295, 316; 455/69, 522
See application file for complete search history.

(56) References Cited

U.S. PATENT DOCUMENTS

| 7,123,580 | B2 * | 10/2006 | Tang et al. ..................... 370/210 |
| 7,826,435 | B1 * | 11/2010 | Wu et al. ....................... 370/342 |
| 2005/0128993 | A1 * | 6/2005 | Yu et al. ......................... 370/342 |
| 2006/0034244 | A1 * | 2/2006 | Huang et al. ................... 370/344 |
| 2006/0270431 | A1 * | 11/2006 | Yoshi ............................. 455/522 |
| 2007/0281693 | A1 * | 12/2007 | Ballentin et al. ............ 455/435.1 |
| 2008/0152028 | A1 * | 6/2008 | Futaki et al. .................. 375/260 |

FOREIGN PATENT DOCUMENTS

EP 1876785 A2 * 1/2008

* cited by examiner

*Primary Examiner* — David B. Lugo (57) ABSTRACT

An apparatus is capable of distributing power over a number of subcarriers in an OFDM system. The transmission power control method for an Orthogonal Frequency Division Multiplexing (OFDM) communication system according to the present invention includes measuring, at a receiver, channel coefficients of subcarriers, classifying the subcarriers into a predetermined number of groups according to sizes of channel coefficients, generating group indices, and transmitting the group indices of the subcarriers to a transmitter. A transmitter is capable of receiving the group indices of the subcarriers, determining per-group transmission powers, allocating the per-group transmission powers to the corresponding groups, distributing the per-group transmission power over subcarriers in the same level within respective groups, and transmitting signals over the subcarriers with the distributed power level.

20 Claims, 5 Drawing Sheets

POWER DISTRIBUTION METHOD AND APPARATUS FOR OFDM SYSTEM

CROSS-REFERENCE TO RELATED APPLICATION(S) AND CLAIM OF PRIORITY

The present application is related to and claims priority to an application entitled "POWER DISTRIBUTION METHOD AND APPARATUS FOR OFDM SYSTEM" filed in the Korean Intellectual Property Office on Feb. 6, 2009 and assigned Serial No. 10-2009-0009666, the contents of which are incorporated herein by reference.

TECHNICAL FIELD OF THE INVENTION

The present invention relates to an Orthogonal Frequency Division Multiplexing (OFDM) system and, in particular, to a method and apparatus for distributing power over a number of subcarriers in an OFDM system.

BACKGROUND OF THE INVENTION

In an OFDM communication system, the transmitter performs channel coding on the transmission data, maps the channel coded data to the subcarriers, transforms the subcarriers into OFDM symbol on the time domain by means of Inverse Fast Fourier Transform (IFFT), inserts Cyclic Prefix (CP) onto each OFDM symbol, and transmits the CP-added OFDM symbol; and the receiver removes the CP, transforms the CP-removed OFDM symbol into the subcarriers on the frequency domain, de-maps the subcarriers into channel coded data, and performs channel decoding on the channel coded data to recover the transmission data.

When the receiver has a return channel in the OFDM system, the channel value is fed back per subcarrier to improve the communication efficiency. In this case, since the channel gains of the subcarriers are different from each other, the receiver is needed to use large amount of resources for feedback of the channel information about all the subcarriers, and the transmitter is needed to perform complex computation for power distribution ratio among the subcarriers by processing the feedback information.

SUMMARY OF THE INVENTION

To address the above-discussed deficiencies of the prior art, it is a primary object to provide a power distribution method and apparatus for an OFDM communication system that is capable of reducing the feedback amount of the receiver without increasing complexity for computing the power distribution ratio at the transmitter.

Also, the present invention provides a power distribution method and apparatus for an OFDM communication system that is capable of reducing the feedback amount of the receiver by classifying the subcarriers into groups according to the channel coefficient values of the subcarriers and transmitting the group indices of the subcarriers as the channel information.

Also, the present invention provides a power distribution method and apparatus for an OFDM communication system that is capable of reducing computation complexity for power distribution by distributing transmission power based on the group indices of the subcarriers that are determined according to the channel coefficient values measured at the receiver.

In accordance with an exemplary embodiment of the present invention, a transmission power control method for an Orthogonal Frequency Division Multiplexing (OFDM) communication system includes measuring, at a receiver, channel coefficients of subcarriers, classifying the subcarriers into a predetermined number of groups according to sizes of channel coefficients, generating group indices, and transmitting the group indices of the subcarriers to a transmitter; and receiving, at the transmitter, the group indices of the subcarriers, determining per-group transmission powers, allocating the per-group transmission powers to the corresponding groups, distributing the per-group transmission power over subcarriers in the same level within respective groups, and transmitting signals over the subcarriers with the distributed power level.

In accordance with another exemplary embodiment of the present invention, a transmission power control apparatus for an Orthogonal Frequency Division Multiplexing (OFDM) communication system includes a receiver which measures channel coefficients of subcarriers, classifies the subcarriers into a predetermined number of groups according to sizes of channel coefficients, generates group indices, and transmits the group indices of the subcarriers to a transmitter; and a transmitter which receives the group indices of the subcarriers, determines per-group transmission powers, allocates the per-group transmission powers to the corresponding groups, distributes the per-group transmission power over subcarriers in the same level within respective groups, and transmits signals over the subcarriers with the distributed power level.

In accordance with another exemplary embodiment of the present invention, a power control information transmission method of a receiver in an Orthogonal Frequency Division Multiplexing (OFDM) communication system includes measuring channel coefficients of subcarriers; sorting the subcarriers in order of channel coefficient sizes; classifying the subcarriers into a predetermined number of groups according to the channel coefficient sizes; generating group indices corresponding to the groups; and feeding back the group indices of the subcarriers to a transmitter as power control information.

In accordance with another exemplary embodiment of the present invention, a transmission power control method of a transmitter in an Orthogonal Frequency Division Multiplexing (OFDM) communication system includes receiving group indices of the subcarriers transmitted by a receiver; calculating per-group achievable transmission rate according to average us powers of respective groups; determining per-group powers based on the per-group achievable transmission rates; distributing per-group powers over the subcarriers in the same level within respective groups; and controlling transmission powers of the subcarriers based on the distributed power levels.

In accordance with another exemplary embodiment of the present invention, a receiver device that transmitting power control information on subcarriers in an Orthogonal Frequency Division Multiplexing (OFDM) communication system includes: a received power measurer that measures channel coefficients of the subcarriers; a coefficient sorter that sorts the subcarriers in order of channel coefficient size; a group index generator that classifies the sorted subcarriers into a predetermined number of groups, groups the subcarriers into corresponding groups according to the channel coefficient sizes, and allocates the same group indices to the subcarriers within same group; and a control channel transmitter that feeds back the group indices of the subcarriers to a transmitter device.

In accordance with still another exemplary embodiment of the present invention, a transmitter that controls transmission powers of subcarriers in an Orthogonal Frequency Division Multiplexing (OFDM) communication system includes a transmission rate calculator which calculates per-group achievable transmission rates based on average user powers of the groups; a power determiner that determines per-group powers based on the per-group achievable transmission rates; a power distributer that distributes per-group powers over the subcarriers in the same level within respective groups; and a subcarrier allocator and demapper that controls the transmission powers of the subcarriers transmitted with the distributed power.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Detailed descriptions of well-known functions and structures incorporated herein may be omitted to avoid obscuring the subject matter of the present invention. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In an exemplary embodiment of the present invention, a method and apparatus for distributing power over multiple subcarriers in an OFDM communication system is proposed. In an exemplary embodiment of the present invention, the receiver feeds back subcarrier index values rather than channel values of the subcarriers to reduce the feedback amount. In an exemplary embodiment of the present invention, the transmitter allocates the power by subcarrier group, thereby reducing feedback amount of the receiver without compromising transmission data rate.

In an exemplary embodiment of the present invention, transmitter determines optimal power distribution ratios of the subcarriers using the relative sizes of the channel coefficients of the subcarriers that are fed back by the receiver. The receiver sorts the total N subcarriers of the OFDM system in order of channel coefficient, classifies the sorted subcarriers into U subcarrier groups, and checks the subcarrier groups containing the individual subcarriers, and transmits the group indices to the transmitter as feedback information. The receiver analyzes the sizes of the channel coefficients and determines the subcarrier group corresponding to each subcarrier according to the analysis result. The receiver generates the group indices corresponding to the individual subcarriers and transmits the group indices to the transmitter as feedback information.

The transmitter performs power allocation to all the subcarriers based on the feedback information transmitted by the receiver. At this time, the transmitter checks the subcarrier group of each subcarrier, calculates the achievable transmission rates of the respective subcarrier groups based on the average use powers of the groups, determines the per-group transmission power to minimize the system utilization power while maintaining the total achievable transmission rate of the system, and allocates the per-group transmission power to the corresponding subcarriers.

A description is made of the method for generating, at the receiver, feedback information about the subcarriers and allocating, at the transmitter, transmission power to the subcarriers based on the feedback information in detail.

In the following description, a description is made under the assumption of the OFDM system using total N subcarriers. Assuming that the CP is long enough, the Inter-Symbol-Interference (ISI) can be removed on each subcarrier and, in this case, the channel model of each subcarrier can be expressed as Equation 1:

$$r_k = h_k x_m + n_m \text{ for } k=1,2,\ldots,N. \quad \text{[Eqn. 1]}$$

where $h_k$ is a channel coefficient of $k^{th}$ subcarrier.

Similar to power distribution in a Multiple Input Multiple Output (MIMO) system, the power distribution of the OFDM system can be performed by determining optimal power distribution ratios of the subcarriers using the relative sizes of channel coefficients of the subcarriers. For this purpose, the channel coefficients of the subcarriers are sorted in order of size and classified into U groups, and the group information of individual subcarriers are feed back to the transmitter.

Figure 1:
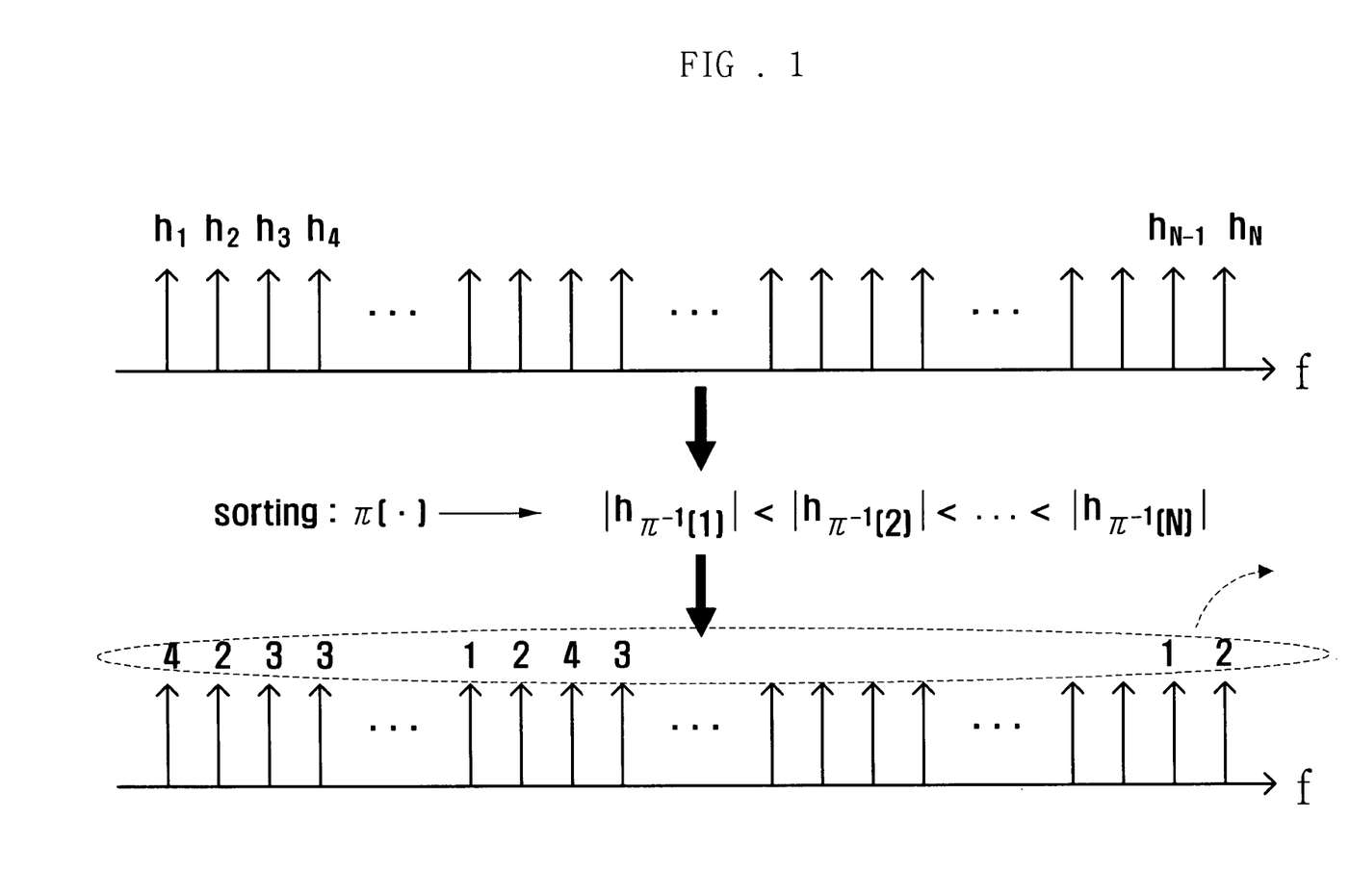
FIG. 1 illustrates a principle of grouping subcarriers for a power distribution method in an OFDM system according to an exemplary embodiment of the present invention.

FIG. 1 illustrates a principle of grouping subcarriers for a power distribution method in an OFDM system according to an exemplary embodiment of the present invention. FIG. 1 is depicted under the assumption of the number of groups U=4.

Referring to FIG. 1, the subcarriers are classified into four groups according to the sizes of their channel coefficients. The subcarriers of which channel coefficient sizes are ranked in the lower 25% of the total range are classified into group 1, the subcarriers of which channel coefficient sizes are ranked between lower 25% and 50% are classified into group '2', the subcarriers of which channel coefficient sizes are ranked in the upper 25% of the total range are classified into group '4', and the subcarriers of which channel coefficient sizes are ranked between upper 25% and 50% of the total range are classified into group '3'. The receiver feeds back the group indices rather than channel coefficients of the individual subcarriers. Accordingly, total number of bits for feedback information in the OFDM system using N subcarriers can be expressed as Equation 2:

$$B_{feedback} = N \cdot \lceil \log_2 U \rceil \text{ bits} \quad [\text{Eqn. 2}]$$

In Equation 2, it is assumed that the size of channel coefficient per subcarrier follows Rayleigh distribution and statistically independent. At this time, a new probability variable $A_{j|N}$ is defined as Equation 3:

$$A_{i|N} \triangleq [|h_1|, |h_2|, \ldots, |h_N|]_{i|N} \quad [\text{Eqn. 3}]$$

where $[\bullet]_{i|j}$ denotes an element having the $i^{th}$ size among total j elements, and the probability density function of $A_{j|N}$ can be written as Equation 4:

$$P_{A_{j|N}}(x) = \frac{N!}{(i-1)!} \sum_{j=0}^{N-i} \frac{(-1)}{(N-i-j)!j!} \exp(-(i+j)x) \quad [\text{Eqn. 4}]$$

From Equations 1 and 4, the achievable transmission rate $C^{(i|N)}(\sigma, p_i)$ of the subcarrier having $i^{th}$ channel coefficient size among N subcarriers. In case that σ is normalized into 1, the achievable transmission rate is $C^{(i|N)}(p_i)$. Using Equation 4, the average achievable transmission rate of $u^{th}$ group of the OFDM system can be calculated by Equation 5:

$$C_u(p^{(u)}) = \frac{U}{N} \sum_{i=1+N(u-1)/U}^{Nu/U} C^{(i|N)}(p^{(u)}) \quad [\text{Eqn. 5}]$$

where $p^{(u)}$ denotes the average power of the subcarriers of $u^{th}$ group.

Figure 2:
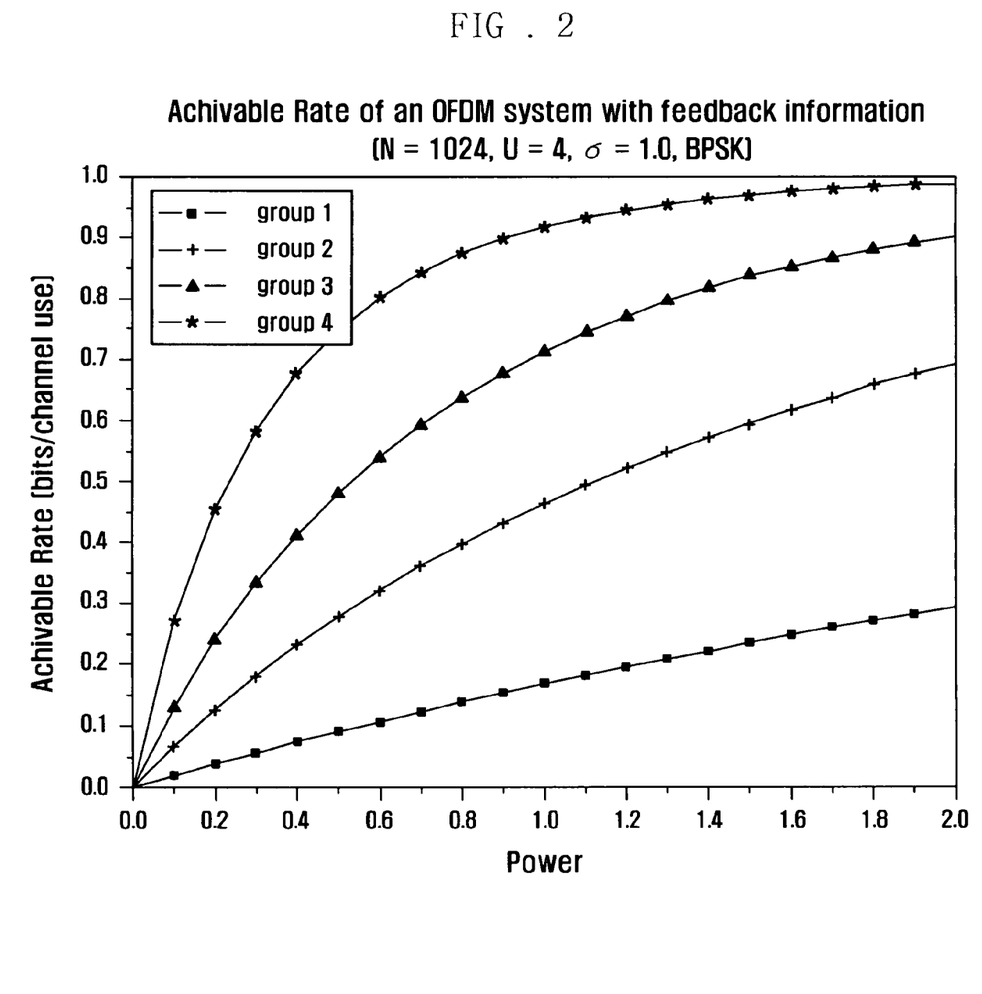
FIG. 2 illustrates achievable transmission rate of the OFDM system with feedback information according to an exemplary embodiment of the present invention.

FIG. 2 illustrates achievable transmission rate of the OFDM system with feedback information according to an exemplary embodiment of the present invention.

FIG. 2 shows the achievable transmission rates of the groups when σ is normalized into 1 with N=24 and U=4 and BPSK constellation is used.

Figure 3:
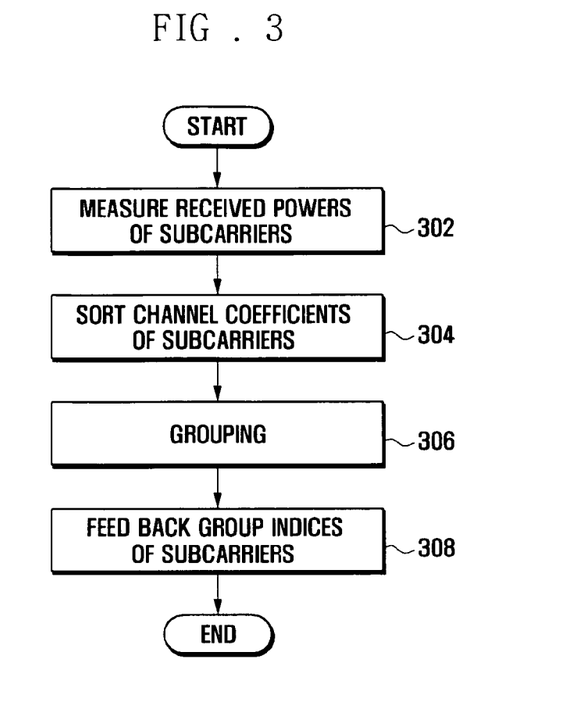
FIG. 3 illustrates a feedback procedure of the power distribution method according to an exemplary embodiment of the present invention.

In FIG. 3, if N is very large, it is difficult to calculate the factorials of N in Equation 4. In this case, the achievable transmission rate per group can be calculated with $p_{i|N}(x)$ calculated statistically using the Monte Carlo method.

Using the feedback information, the transmitter can check the groups to which the individual subcarriers belong. Since the average achievable transmission rate is known according to the use power of the groups, it is possible to improve the performance through per-group power distribution. The optimization problem about the power distribution to minimize the system power usage while maintaining the total achievable transmission rate of the system can be configured as Equation 6:

$$\min_p \sum_{u=1}^{U} p^{(u)} \quad [\text{Eqn. 6}]$$

$$\text{s.t.} \quad \frac{1}{U} \sum_{u=1}^{U} C_u(p^{(u)}) \geq R_t$$

where $p = [p^{(1)}, p^{(2)}, \ldots, p^{(U)}]$ and $R_t$ is the channel coding rate of a channel code. Since this problem is difficult to solve inclosed form, the optimal p is found through a brute-force search. Table 1 shows the gains of the noise thresholds according to the p and power variance optimized per coding rate in the OFDM system using 1024 subcarriers and BPSK signal constellation.

TABLE 1

| Code rate | Power allocation (ratio) | | | | Allocation gain (dB) |
| --- | --- | --- | --- | --- | --- |
| | $p_1$ | $p_2$ | $p_3$ | $p_4$ | |
| 0.1 | 0 | 0 | 0 | 1 | 2.74 |
| 0.15 | 0 | 0 | 0.065 | 0.935 | 2.25 |
| 0.2 | 0 | 0 | 0.312 | 0.688 | 1.99 |
| 0.25 | 0 | 0 | 0.42 | 0.58 | 1.61 |
| 0.3 | 0 | 0 | 0.469 | 0.531 | 1.25 |
| 0.35 | 0 | 0.164 | 0.453 | 0.383 | 0.97 |
| 0.4 | 0 | 0.194 | 0.455 | 0.351 | 0.92 |
| 0.45 | 0 | 0.257 | 0.414 | 0.329 | 0.79 |
| 0.5 | 0 | 0.326 | 0.364 | 0.31 | 0.67 |

FIG. 3 illustrates a feedback procedure of the power distribution method according to an exemplary embodiment of the present invention.

Referring to FIG. 3, the receiver first measures the received signal strengths on the individual subcarriers (i.e. channel coefficients of the subcarriers) (block 302). Here, the channel model of each subcarrier is expressed as Equation 1 where the channel coefficient is $h_k$=k=1, 2, ... N). The channel coefficients of the individual subcarriers can be obtained as described with reference to FIG. 1. Thereafter, the receiver sorts the subcarriers in descending order of channel coefficient size (block 304) and classifies the subcarriers into a predetermined number of groups according to the sizes of the their channel coefficients (block 306). Here, the number of subcarrier groups can be configured through negotiation between the transmitter (such as a base station) and the receiver (such as a mobile station), by the transmitter determining and notifying the receiver, or by the receiver determining and notifying the transmitter. The channel coefficient values contained in each group are mapped to the corresponding subcarriers indices one by one.

As described above, the subcarriers are classified into U subcarrier groups in order of channel coefficient size and the U subcarrier groups are assigned group indices. The receiver measures the sizes of the channel coefficients of the individual subcarriers mapped to the transmission signals and classifies the subcarriers into the groups according to the channel coefficient sizes. For example, if U=4, the subcarriers are classified into four groups according to their channel coefficient values allowing with the group indices (e.g., 00, 01, 10, and 11). After the subcarriers have been grouped, the receiver (e.g., uplink control channel transmitter) transmits the group indices corresponding to the individual subcarriers to transmitter (e.g., base station) through a return channel (block 308). Here, the number of bits constituting a group index is determined by Equation 2. If U=4, the number of bits of the feedback information is 2N.

Figure 4:
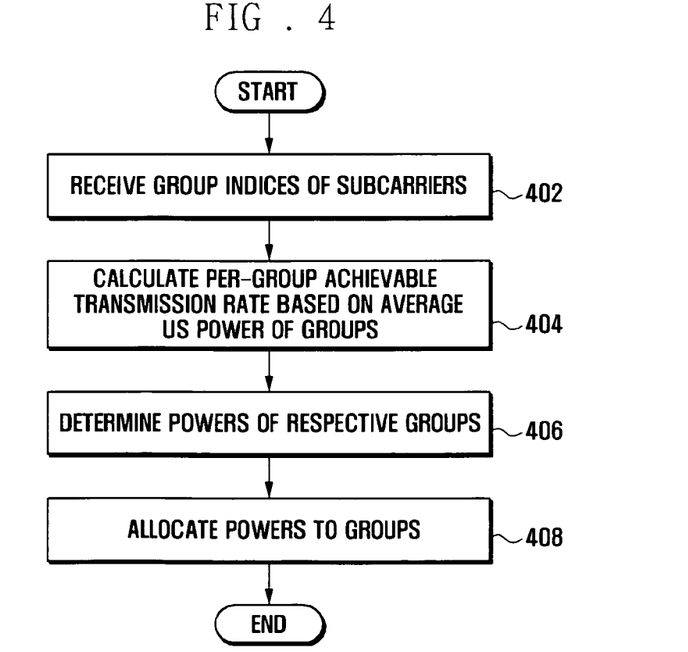
FIG. 4 illustrates a transmission power allocation procedure of the power distribution method according to an exemplary embodiment of the present invention.

FIG. 4 illustrates a transmission power allocation procedure of the power distribution method according to an exemplary embodiment of the present invention.

Referring to FIG. 4, the transmitter receives the group indices transmitted by the receiver through the return channel (block 402). If the group indices as the feedback information have been received, the receiver calculates the achievable transmission rate per group based on the group indices of the individual subcarriers (block 404). The per-group achievable transmission rate calculation is a procedure for calculating the average data amount available with the powers allocated to the subcarrier with the corresponding group by allocating the same level of power to the groups and then distribute the allocated power over the subcarriers within the group. The per-group achievable transmission rate can be calculated using Equation 5. Once the per-group achievable transmission rate has been calculated, the transmitter determines the power level to be allocated to the individual groups based on the per-group achievable transmission rate (block 406). The transmission power levels of the groups are determined by distributing the power in such a manner that the total system use power is minimized while maintaining the total achievable transmission rate of the system. The per-group power level can be calculated using Equation 6. Next, the transmitter allocates the power to the groups based on the per-group power levels and distributes the power allocated to the groups over all the subcarriers within respective groups at the same level (block 408). Assuming four groups, the power is controlled in four levels. The transmitter calculates the achievable transmission rates of the four groups at step 404 and determines the power levels of the four groups based on their achievable transmission rates at block 406.

Figure 5:
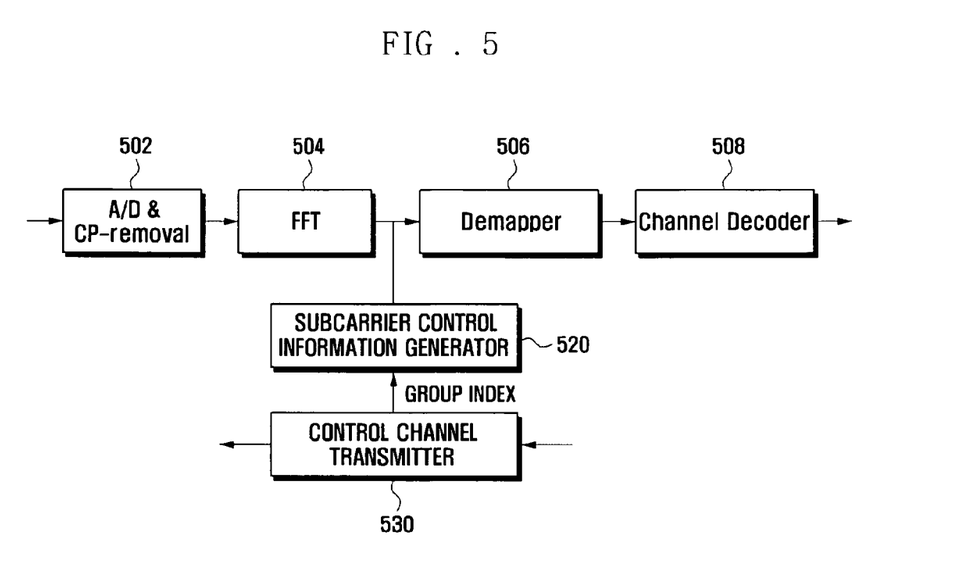
FIG. 5 illustrates a configuration of a receiver for an OFDM-based communication according to an exemplary embodiment of the present invention.
Figure 6:
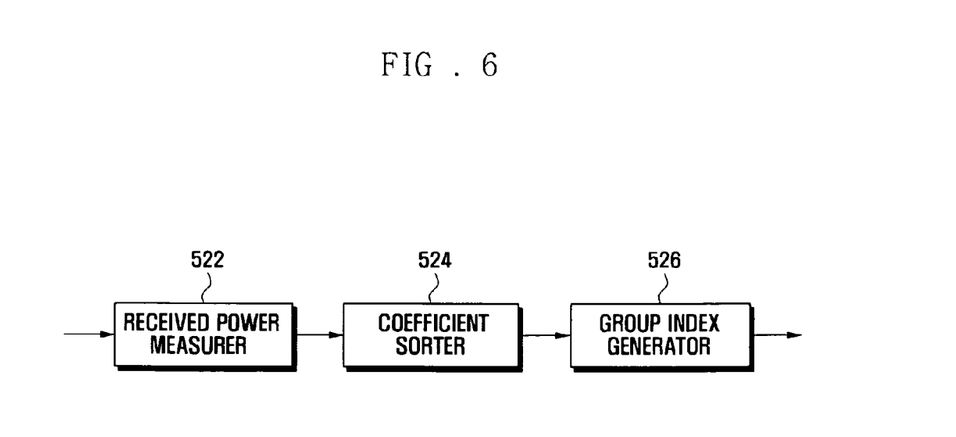
FIG. 6 illustrates a configuration of a control information generator of the receiver of FIG. 5.

FIG. 5 illustrates a configuration of a receiver for an OFDM-based communication according to an exemplary embodiment of the present invention, and FIG. 6 illustrates a configuration of a control information generator of the receiver of FIG. 5.

As shown in FIG. 5, the receiver includes an Analog/Digital (A/D) converter & CP remover 502 which convert an analog signal received through an antenna to a digital signal and removing the CP from the OFDM symbol, a Fast Fourier Transformer (FFT) 504 that transforms the CP-removed OFDM symbol into subcarriers on the frequency domain, a demapper 506 that de-maps the subcarriers into the channel coded data, a channel decoder 508 that decodes the channel coded data to recover the transmission data, a subcarrier control information generator 520 that measures the channel coefficients of the subcarriers and generating group indices for the individual subcarriers, and a control channel transmitter 530 generating control information containing the group indices of the respective subcarriers and transmitting the control information to the transmitter (e.g. base station).

As shown in FIG. 6, the subcarrier control information generator 520 includes a received power measurer 522 that measures the received signal powers of the individual subcarriers, a coefficient sorter 524 that sorts the subcarriers in order of channel coefficient, and a group index generator that classifies the subcarriers into groups according to their channel coefficients and generates the group indices of the subcarriers.

Referring to FIGS. 5 and 6, the A/D converter & CP remover 502 converts the received analog signal to a digital signal and removes the CP from the OFDM symbol distorted by the propagation delay and multipath fading. Prior to the A/D converter & CP remover 502, a down-converter can be arranged for down-converting the received radio signal to a baseband signal. The CP-removed OFDM symbol is input to the FFT 504 so as to be output in the form of subcarriers on the frequency domains.

At this time, the subcarrier control information generator 520 measures the received signal powers of the subcarriers output by the FFT 504 and generates the group indices of the individual subcarriers. The subcarrier control information generator 520 can be configured as shown in FIG. 6. The received power measurer 522 measures the received signal powers (i.e. channel coefficients) of the individual subcarriers output by the FFT 504. At this time, the channel coefficient values of the subcarriers can be output as shown in FIG. 1. The coefficient sorter 534 receives the channel coefficients of the subcarriers output by the received power measurer 522 and sorts the channel coefficients in descending order and outputs the sorted channel coefficients to the group index generator 526. The group index generator 526 classifies the subcarriers into predetermined number of groups according to their channel coefficients and generates the group indices of the individual subcarriers. Here, the number of groups is known to both the transmitter (such as a base station) and the receiver (such as a mobile station). The group index generator 526 maps the channel coefficient values to the corresponding subcarrier indices one by one.

The subcarrier control information generator 520 feeds backs the group indices of the individual subcarriers to the transmitter through a return channel. Here, the return channel can be an uplink control channel. The subcarrier control information generator 520 outputs the group indices of the individual subcarriers to the control channel transmitter 530, and the control channel transmitter 530 transmits the group indices of the individual subcarriers to the transmitter along with other control information. Here, the subcarrier control information generator 520 can be the controller of the receiver (mobile station) or the modem controller when the receiver is implemented with a separate modem controller.

The output signal of the FFT 504, i.e., the subcarriers, is input to the demapper 506 so as to be demapped into channel coded data. In case that the channel coded data are interleaved at the transmitter, the channel coded data are deinterleaved by a deinterleaver (not shown) before being input to the demapper 506. The channel coded data output by the demapper 506 are decoded by the channel decoder 508 so as to be recovered as the transmitted data transmitted by the transmitter.

Figure 7:
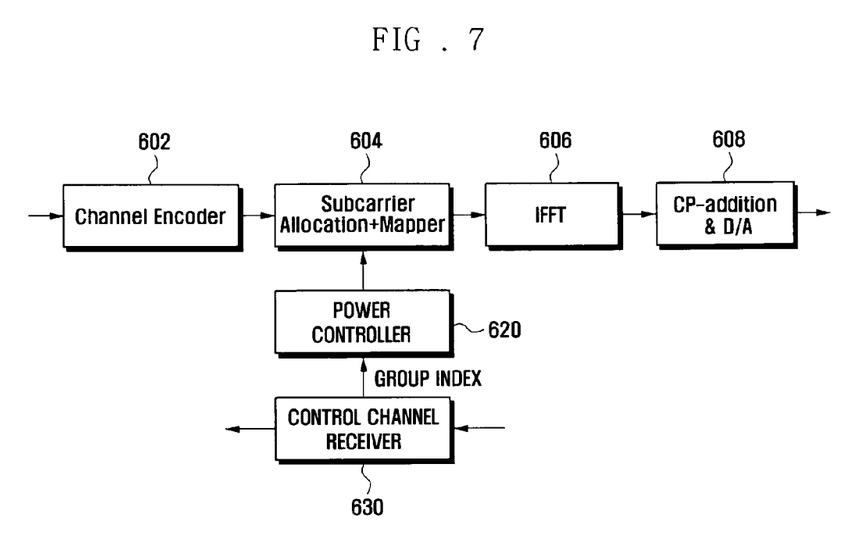
FIG. 7 illustrates a configuration of a transmitter for an OFDM-based communication system according to an exemplary embodiment of the present invention.
Figure 8:
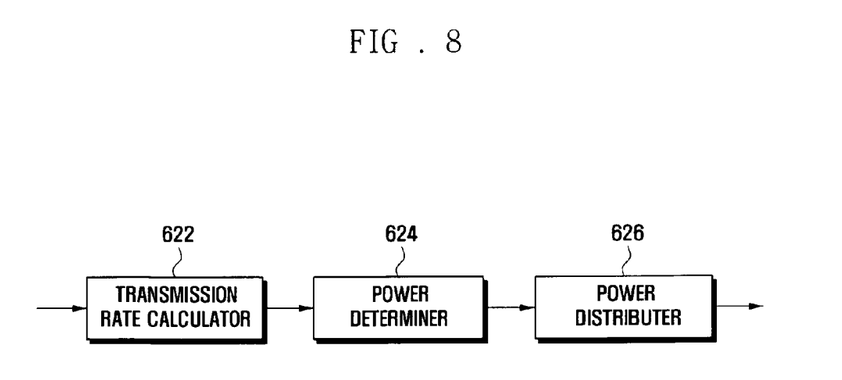
FIG. 8 illustrates a configuration of a power controller of the transmitter of FIG. 7.

FIG. 7 illustrates a configuration of a transmitter for an OFDM-based communication system according to an exemplary embodiment of the present invention, and FIG. 8 illustrates a configuration of a power controller of the transmitter of FIG. 7.

As shown in FIG. 7, the transmitter includes a channel encoder 602 that channel encodes the received packet data, a subcarrier allocator & symbol mapper 604 that allocates subcarriers to the packet data and maps the packet data to the symbols, an IFFT 606 that transforms the symbols into an OFDM symbol on time domain, a CP inserter & Digital/Analog (D/A) converter 608 that inserts a CP onto the OFDM symbol and converting the CP-added OFDM symbol into analog signal, a control channel receiver 630 that receives the control information transmitted by a receiver, and a power controller 620 that extracts the group indices of the subcarriers from the uplink control information and controls transmission power of the subcarriers for downlink transmission based on the group indices of the subcarriers.

As shown in FIG. 8, the power controller 620 includes a transmission rate calculator 622 that calculates the achievable transmission rate of the groups based on the group indices of the subcarriers, a power determiner 624 that determines the transmission powers of the groups based on the per-group achievable transmission rates, and a power distributer 626 that allocates the powers to the groups based on the per-group power levels and distributing the power allocated to each group to all the subcarriers within the corresponding group.

Referring to FIGS. 7 and 8, the channel encoder 602 performs channel encoding on the input physical layer packet data to output channel coded bit stream. The channel coded bit stream can be interleaved by an additional channel interleaver for additional diversity gain. The channel coded bit stream is input to the subcarrier allocator & mapper 604. The subcarrier allocator & mapper 604 allocates subcarriers to the respective bits and mapping the channel coded symbols to the subcarriers.

At this time, the uplink control channel receiver 630 receives the uplink control information transmitted by the receiver (such as a mobile station). The uplink control information includes the group indices of the subcarriers. The power controller 620 analyzes the group indices of the subcarriers and allocates transmission power to the subcarriers based on the analysis result.

More particularly, if the group indices of the individual subcarriers are received, the transmission rate calculator 622 calculates the achievable transmission rates of the groups with the group indices of the subcarriers by using Equation 5. The group achievable transmission rate calculation is a process for calculating the average data amount available with the powers allocated to the subcarrier with the corresponding group by allocating the same level of power to the groups and then distribute the allocated power over the subcarriers within the group. The power determiner 624 determines the power levels to be allocated to the respective groups based on the achievable transmission rates by using equation 6. The transmission power levels of the groups are determined by distributing the power in such a manner that the total system use power is minimized while maintaining the total achievable transmission rate of the system. The power distributer 626 allocates the power to the groups based on the per-group power levels and distributes the power allocated to the groups over all the subcarriers with respective groups. The power distributer 626 can distribute the same power to the subcarriers within the same group.

As aforementioned, the power controller 620 analyzes the group indices of the subcarriers acquired from the feedback information transmitted by the receiver (mobile station) and outputs the analysis result to the subcarrier allocator & mapper 604. The subcarrier allocator and mapper 604 maps the channel coded symbols to the power-allocated subcarriers and outputs the symbols superimposed on the subcarriers to the IFFT 606. Here, the power controller 630 can be a modem controller of the transmitter (base station), particularly a modulation controller of the modem controller which controls the modulation of the transmission signal.

The symbols output by the subcarrier allocator & mapper 604 are transformed into an OFDM symbol by the IFFT 606. The CP inserter & D/A 608 inserts a CP onto the OFDM symbol and converts the CP added OFDM symbol to an analog signal to be transmitted.

The power distribution method and apparatus for an OFDM system according to the present invention is capable of reducing the feedback amount of the receiver by grouping the subcarriers according to the channel coefficient values of the subcarriers and transmitting group indices of the subcarriers as the feedback information.

Also, the power distribution method and apparatus for an OFDM system according to the present invention is capable of reducing computation complexity for power distribution by distributing transmission power based on the group indices of the subcarriers that are determined according to the channel coefficient values measured at the receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmission power control method for an Orthogonal Frequency Division Multiplexing (OFDM) communication system, the method comprising:
measuring, at a receiver, channel coefficients of subcarriers;
classifying the subcarriers into a predetermined number of groups according to sizes of channel coefficients;
generating a group index for each of the predetermined number of groups to generate group indices;
mapping the channel coefficients of the groups to corresponding group indices one by one, wherein the groups are allocated respective group indices;
transmitting, for each subcarrier in the subcarriers, the group index of the subcarrier as feedback information for the subcarrier to a transmitter; and
receiving, from the transmitter, signals over the subcarriers with per-group transmission powers according to the group indices of the subcarriers,
wherein the per-group transmission powers are determined based on per-group achievable transmission rates, and the per-group achievable transmission rates are calculated based on average user powers of the groups.

2. The transmission power control method of claim 1, wherein generating the group indices comprises:
sorting the subcarriers in order of channel coefficient size;
grouping the subcarriers into corresponding groups according to the channel coefficient sizes;
allocating same group indices to the subcarriers within a same group; and
feeding back the group indices of the subcarriers to the transmitter.

3. A transmission power control method for an Orthogonal Frequency Division Multiplexing (OFDM) communication system, comprising:
receiving, at a transmitter, group indices of subcarriers, the group indices being allocated to groups of the subcarriers having a same size of channel coefficients;
determining per-group transmission powers, wherein determining the per-group transmission powers comprises calculating per-group achievable transmission rates based on average user powers of the groups and determining per-group powers based on the per-group achievable transmission rates;
allocating the per-group transmission powers to corresponding groups;
distributing the per-group transmission power over the subcarriers in a same level within respective groups; and
transmitting signals over the subcarriers with the distributed power level.

4. The transmission power control method of claim 3, wherein transmitting the signals comprises:
controlling transmission powers of the subcarriers based on the distributed power levels.

5. The transmission power control method of claim 4, wherein the per-group achievable transmission rates are calculated by equation $$C_u(p^{(u)}) = \frac{U}{N} \sum_{i=1+N(u-1)/U}^{N_u/U} C^{(i|N)}(p^{(u)})$$

where N is a number of the subcarriers, U is a number of the groups of the subcarriers, $p^{(u)}$ denotes the average power of the subcarriers of $u^{th}$ group, and the per-group powers are calculated by equation $$\min_p \sum_{u=1}^{u} p^{(u)},$$

s.t.

$$\frac{1}{U}\sum_{u=1}^{U} C_u(p^{(u)}) \geq R_t$$

where $p=[p^{(1)}, p^{(2)}, \ldots, p^{(U)}]$ and $R_t$ is the channel coding rate of a channel code.

6. A transmission power control apparatus for an Orthogonal Frequency Division Multiplexing (OFDM) communication system, the apparatus comprising:
a receiver configured to:
measure channel coefficients of subcarriers;
classify the subcarriers into a predetermined number of groups according to sizes of channel coefficients;
generate a group index for each of the predetermined number of groups to generate group indices;
map the channel coefficients of the groups to corresponding group indices one by one, wherein the groups are allocated respective group indices;
transmit, for each subcarrier in the subcarriers, the group index of the subcarrier as feedback information for the subcarrier to a transmitter for the transmitter; and
receive, from the transmitter, signals over the subcarriers with per-group transmission powers according to the group indices of the subcarriers,
wherein the per-group transmission powers are determined based on per-group achievable transmission rates, and the per-group achievable transmission rates are calculated based on average user powers of the groups.

7. The transmission power control apparatus of claim 6, wherein the receiver comprises:
a received power measurer configured to measure the channel coefficients of the subcarriers;
a coefficient sorter configured to sort the subcarriers in order of channel coefficient size; and
a group index generator configured to:
classify the sorted subcarriers into the predetermined number of groups;
group the subcarriers into corresponding groups according to the channel coefficient sizes; and
allocate same group indices to the subcarriers within a same group.

8. A transmission power control apparatus for an Orthogonal Frequency Division Multiplexing (OFDM) communication system, the apparatus comprising:
a transmitter configured to:
receive group indices of subcarriers, the group indices being allocated to groups of the subcarriers having a same size of channel coefficients;
determine per-group transmission powers, wherein to determine the per-group transmission powers, the transmitter is configured to calculate per-group achievable transmission rates based on average user powers of the groups and determine per-group powers based on the per-group achievable transmission rates;
allocate the per-group transmission powers to corresponding groups;
distribute the per-group transmission power over the subcarriers in a same level within respective groups; and
transmit signals over the subcarriers with the distributed power level.

9. The transmission power control apparatus of claim 8, wherein the transmitter comprises:
a power distributor configured to control transmission powers of the subcarriers based on the distributed power levels.

10. The power control information transmission method of claim 1, wherein generating the group indices comprises:
sorting the subcarriers in order of channel coefficient size; and
grouping the subcarriers into corresponding groups according to the channel coefficient sizes.

11. The power control information transmission method of claim 1, wherein transmitting the group indices comprises feeding back the group indices of the subcarriers to the transmitter as power control information.

12. The power control information transmission method of claim 1, wherein the receiver feeds back the group indices rather than the channel coefficients of the subcarriers as the feedback information for the subcarriers.

13. The power control information transmission method of claim 1, wherein generating the group indices comprises allocating same group indices to the subcarriers within a same group.

14. The transmission power control method of claim 3, wherein the group indices of the subcarriers are received through an uplink control channel.

15. The transmission power control apparatus of claim 6, wherein to generate the group indices, the receiver is further configured to:
sort the subcarriers in order of channel coefficient size; and
group the subcarriers into corresponding groups according to the channel coefficient sizes.

16. The transmission power control apparatus of claim 6, wherein to transmit the group indices, the receiver is further configured to feed back the group indices of the subcarriers to the transmitter as power control information.

17. The transmission power control apparatus of claim 6, wherein the receiver is configured to feed back the group indices rather than the channel coefficients of the subcarriers as the feedback information for the subcarriers.

18. The transmission power control apparatus of claim 6, wherein to generate the group indices the receiver is further configured to allocate same group indices to the subcarriers within a same group.

19. The transmission power control apparatus of claim 9, wherein the group indices of the subcarriers are received through an uplink control channel.

20. The transmission power control apparatus of claim 9, wherein the per-group achievable transmission rates are calculated by equation $$C_u(p^{(u)}) = \left(\frac{U}{N}\right) \sum_{i=1+N\cdot(u-1)/U}^{N\cdot u/U} C^{(i|N)}(p^{(u)})$$

where N is a number of the subcarriers, U is a number of the groups of the subcarriers, $p^{(u)}$ denotes the average power of the subcarriers of $u^{th}$ group, and the per-group powers are calculated by equation $$\min_p \sum_{u=1}^{U} p^{(u)},$$

s.t.

$$\frac{1}{U}\sum_{u=1}^{U} C_u(p^{(u)}) \geq R_t$$

where $p=[p^{(1)}, p^{(2)}, \ldots, p^{(U)}]$ and $R_t$ is the channel coding rate of a channel code.

* * * * *